United States Patent [19]

Kasuga et al.

[11] Patent Number: 4,650,239
[45] Date of Patent: Mar. 17, 1987

[54] LOWER EDGE PORTION STRUCTURE OF FRONT WINDOW

[75] Inventors: Nobuo Kasuga; Hideo Hori, both of Yokosuka, Japan

[73] Assignee: Nissan Motor Co., Ltd., Yokohama, Japan

[21] Appl. No.: 793,986

[22] Filed: Nov. 1, 1985

[30] Foreign Application Priority Data

Nov. 6, 1984 [JP] Japan .......................... 59-167363[U]

[51] Int. Cl.⁴ .............................................. B60J 1/02
[52] U.S. Cl. .................................................. 296/84 R
[58] Field of Search .......................... 296/84 R, 91, 93

[56] References Cited

U.S. PATENT DOCUMENTS 3,719,245 3/1973 Wilfert .............................. 296/84 R
4,544,197 10/1985 Schmidt et al. ................... 296/84 R

FOREIGN PATENT DOCUMENTS 53-136721 10/1978 Japan .
55-42617 3/1980 Japan .
55-50817 4/1980 Japan .
56-22114 2/1981 Japan .
57-62113 4/1982 Japan .
57-62115 4/1982 Japan .

OTHER PUBLICATIONS

Body for Passenger Cars, vol. 13, of Complete Collection on Automotive Engineering, pp. 160-162, published by Sankaido Press in Japan.

*Primary Examiner*—Robert R. Song
*Attorney, Agent, or Firm*—Schwartz, Jeffery, Schwaab, Mack, Blumenthal & Evans

[57] ABSTRACT

A structure for supporting a window panel at the lower edge portion thereof is provided with a ridge portion extending widthwise along the window panel to form a groove between the ridge portion and the lower edge portion of the window panel.

11 Claims, 4 Drawing Figures

LOWER EDGE PORTION STRUCTURE OF FRONT WINDOW

BACKGROUND OF THE INVENTION

The present invention relates to a structure around the lower edge portion of a front window for an automobile, and specificaly an improvement in the structure for supporting the lower edge portion of the window panel for the front window wherein the rain water flowing down along the front window is prevented from being blown up along the front window by wind pressure during driving.

Heretofore, the lower edge portion of the front window for an automobile has a structure, for example, as shown in *Body for Passenger Cars,* Vol. 13, of Complete Collection on Automotive Engineering, pp. 160-162, published by Sankaido Press in Japan, in which a weather strip is used to mount the window panel for the front window on a cowl box comprises a cowl top panel and a dash panel together forming a terminal flange to support the window panel.

With such a construction, a wiper is used to wipe away rain water attached to the front window panel during driving in rainy weather. During driving at high speed, however, rain water that is wiped off by the wipers is blown up again along the surface of the window panel because of wind pressure during driving to obstruct the field of view, which is undersirable from the viewpoint of safety.

SUMMARY OF THE INVENTION

Accordingly, the object of the present invention is to provide an improved structure for the lower edge portion of the front window of an automobile vehicle which accomplishes with a simple structure a satisfactory field of view even during a high speed driving in the rainy weather.

To achieve the above object, the structure for supporting the window panel mounted on the front window according to the present invention has a ridge portion over the lower edge side of the window panel, the ridge portion extending widthwise along the body of the automobile, wherein the inside of the ridge portion forms a guiding groove together with the mating outside part of the lower edge portion of the window panel for guiding rain water to either side of the automobile.

DETAILED DESCRIPTION OF PREFERRED EMBODIMENTS

Referring to FIG. 1 to FIG. 4, an embodiment of the present invention will be described in detail in the following.

Figure 1:
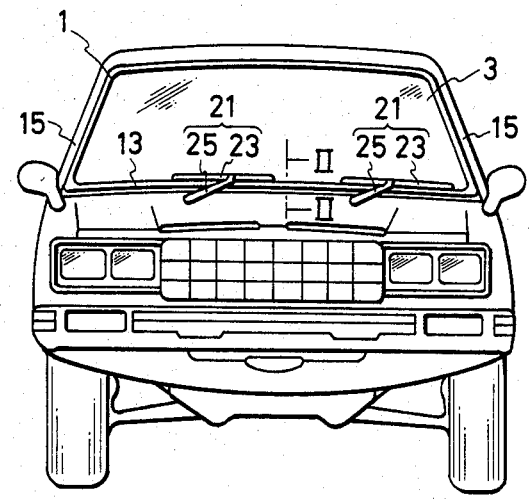
FIG. 1 is a front elevational view of an automobile equipped with an embodiment of the structure according to the present invention.
Figure 2:
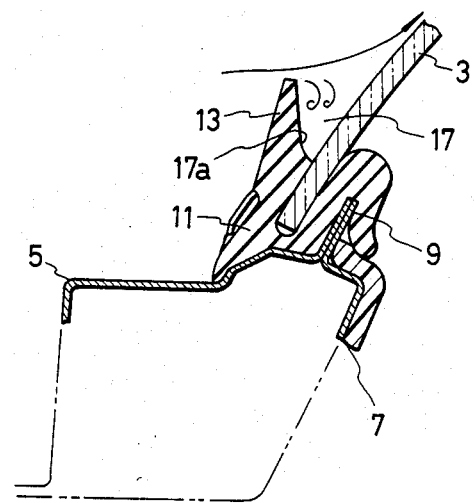
FIG. 2 is a cross-sectional view along the line II—II of FIG. 1.

In the figures, reference numeral 1 designates a front window on which is mounted a windshield panel of glass 3. FIG. 2 shows a structure for supporting the window panel 3 at the lower edge portion of the front window 1. Specifically, a cowl top panel 5 and a dash panel 7 form a terminal flange 9 at the ends thereof. The lower edge of the window panel 3 is supported by the terminal flange 9. A weather strip 11 is used to mount the window panel to the flange 9.

The weather strip 11 is provided with a ridge portion 13 which rises over the outside of the lower end portion of the window glass 3 and extends along the direction of the width of the automobile with the extended ends reaching the positions of two front pillars 15.

Between the inside of the ridge portion 13 and the exposed outside of the window panel 3, there is formed a guiding groove 17 which guides the rain water to the left and right sides, namely, to the sides of both front pillars 15, of the automobile. The bottom 17a of the guiding groove 17 slopes down towards the left and right sides from about the center of the front window 1 to let the rain water flow out from the groove along the slope.

On the other hand, the windshield panel 3 is arranged to be wiped by a pair of wipers 21 with wiper blades 23 placed at left and right locations, and the wiper blades 23 supported by wiper arms 25 are arranged to be operated by turning on a wiper switch (not shown) provided in the automobile at the instrument panel thereof.

The ridge portion 13 in the example of this figure is made from an integral part of the weather strip 11. However, it may also be made as a separate member as described hereinafter.

Figure 3:
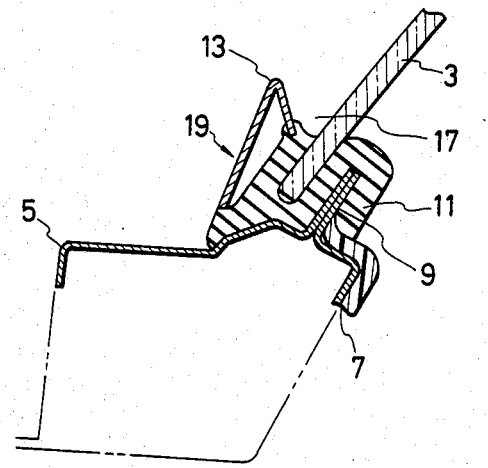
FIG. 3 and FIG. 4 are cross-sectional views similar to FIG. 2 for modifications to the embodiment shown in FIG. 2.
Figure 4:
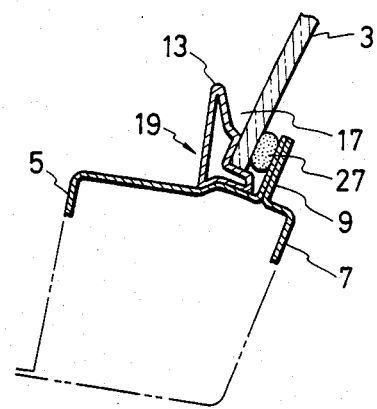

FIG. 3 and FIG. 4 show modifications to the ridge portion 13 shown in FIG. 2. In FIG. 3, there is provided a moulding 19 along the weather strip 11. The ridge portion 13 is formed by raising a portion of the moulding 19 to define the guiding groove 17 with the inside of the moulding 19 and the exposed outside of the lower edge portion of the window panel 3.

Further, in the ridge portion 13 shown by FIG. 4, the lower edge of the window panel 3 is supported by the terminal flange 9 and the moulding 19. An adhesive 27 is used between the window panel 3 and the flange 9. The ridge portion 13 is formed by raising a portion of the moulding and extended along the direction of the width of the automobile to define the guiding groove 17 with the inside of the moulding 19 and the outer surface of the window panel 3.

In operation, rain water wiped away to the guiding groove 17 by the wipers 21 flows to both the left and right sides during ordinary driving in rainy weather.

Next, during driving at high speed an eddy flow will be generated behind the ridge portion 13 creating a separated flow region in the guiding groove 17, as shown by FIG. 2. Therefore, the rain water which was wiped off to the guiding groove 17 will be led to flow to both sides of the automobile without being blown up again along the surface of the window panel 3 by wind pressure. As a result, there will occur no obstruction of the field of view, accomplishing a satisfactory field of view for driving.

As described in the foregoing, according to the present invention, it becomes possible during driving at high speed to prevent the rain water which was wiped off by the wipers from being blown up again along the surface of the window panel due to wind pressure created by fast driving, without requiring a complicated apparatus. Therefore, it enables to accomplish a satisfactory field of view which can contribute substantially to the safety during driving.

What is claimed is:

1. A structure for supporting a windshield panel at the lower edge portion thereof in an automobile body for preventing water wiped off said windshield panel from being blown back onto said windshield panel by airflow impacting said windshield panel, said structure comprising a member for mounting said windshield panel to said automobile body and a ridge portion extending above the exposed outside of said lower edge portion of said windshield panel, said ridge portion extending across substantially the entire width of the front of said automobile body, whereby the inside of said ridge portion and said exposed outside of said lower edge portion of said windshield panel cooperate to form a groove for preventing rain water from flowing back up across said windshield panel and for causing the rain water to flow laterally away from said windshield panel.

2. The structure of claim 1, wherein said member is a weather strip to support said windshield panel on a cowl box, and said ridge portion is integrally formed by part of said weather strip.

3. The structure of claim 1, wherein said member is a weather strip to support said windshield panel on a cowl box; and said ridge portion is made from the upper portion of a moulding provided on said weather strip.

4. The structure of claim 1, wherein said member is a moulding cooperating with a cowl box to sandwich the lower end portion of said windshield panel for supporting, and said ridge portion is formed by the upper portion of said moulding.

5. A windshield construction, comprising:
a front windshield panel for a vehicle; and
means for supporting the front windshield panel at the lower edge thereof and for preventing rain water wiped off said windshield panel from being blown back onto said windshield panel, said means including a raised ridge in front of the lower edge of said windshield panel, forming a groove in which rain water flows laterally away from the windshield panel.

6. A windshield construction as defined in claim 5, wherein said supporting and preventing means comprises a weather strip to support said windshield panel on a cowl box, and said ridge portion is integrally formed by part of said weather strip.

7. A windshield construction as defined in claim 5, wherein said supporting and preventing means comprises a weather strip to support said windshield panel on a cowl box, and said ridge portion is made from the upper portion of a moulding provided on said weather strip.

8. A windshield construction as defined in claim 5, wherein said supporting and preventing means comprises a moulding cooperating with a cowl box to sandwich the lower end portion of said windshield panel for supporting, and said ridge portion is formed by the upper portion of said moulding.

9. A windshield construction, comprising:
a front windshield panel for a vehicle;
means for supporting said windshield panel;
means for deflecting air flow due to movement of the vehicle in such a way so as to create eddy currents at the base of said windshield panel which prevent water wiped down said windshield panel from climbing back up said windshield panel as a result of vehicle movement.

10. A windshield construction as defined in claim 9, wherein said deflecting means comprises a raised ridge mounted in front of the lower portion of said windshield panel.

11. A windshield construction as defined in claim 10, wherein the rear side of said ridge and the outside of the lower portion of said windshield panel cooperate to define a groove in which rain water flows laterally away from the windshield panel under the influence of said eddy currents.

* * * * *